Patented Sept. 5, 1950

2,521,664

UNITED STATES PATENT OFFICE 2,521,664

PROCESSES OF PRODUCING FLUID PURIFICATION MATERIALS AND PRODUCTS THEREOF

James R. Dudley, Cos Cob, Conn., assignor to American Cyanamid Company, New York, N. Y., a corporation of Maine No Drawing. Application December 8, 1945, Serial No. 633,859

10 Claims. (Cl. 210—24)

This invention relates to anion active materials, that is, materials which exchange or extract anions from fluid media.

An object of this invention is to provide synthetic resinous materials having relatively high anion capacities and which are substantially insoluble.

Another object of this invention is to insolubilize condensation products of a polyamine and an aldehyde.

These and other objects are attained by condensing a polyamine with an aldehyde and insolubilizing the resulting product with an aminotriazine-aldehyde condensation product, e. g., a melamine-formaldehyde condensation product.

The following examples in which the proportions are in parts by weight are given by way of illustration and not in limitation.

EXAMPLE 1

284 parts of formalin (37% formaldehyde in water)
63 parts of melamine
3 parts of triethanolamine
150 parts of water This mixture is heated in a suitable reaction vessel provided with an agitator and heated by any suitable means such as a steam bath. The mixture is heated at about 80° C. until the melamine has dissolved, the mixture is cooled to about 30° C. and a solution containing about 95 parts of tetraethylene pentamine and 150 parts of water are added. Since the polyamines such as tetraethylene pentamine give off a considerable amount of heat when dissolved in water, the solution is prepared and cooled down to about 30° C., before its addition, as otherwise there is danger of gelling the reaction mixture containing the melamine. The temperature rises to 50° C. and it is maintained at this point for 10 minutes. About 101 parts of hydrochloric acid (37% HCl in water) are added to the resulting syrup. The temperature is raised to about 95° C. and after approximately 10 minutes at this temperature, a soft, rubbery, red gel is formed. This gel becomes somewhat harder after standing about 1½ hours, and it is then broken up into small pieces and air dried for about 3 hours. The gel is placed in an oven at about 60° C. and dried for about 16 hours followed by an additional heat-treatment for 7 hours at 100° C. The dried product is ground and screened so that the bulk of the material goes through 24 mesh and remains on 30 mesh screens. The ground material may be thoroughly washed with water, with dilute alkali and again with water, preferably distilled water. The packed density of the product is about 20.6 pounds per cubic foot.

A filter bed is prepared by filling a cylinder with the material produced above which has been wet with water. Water containing a relatively low concentration of hydrochloric acid (e. g., 0.01%) is passed through the bed slowly. The effluent remains approximately neutral and there is no test for chloride ions until the bed is exhausted. At this point the bed has absorbed acid, the equivalent of about 16,600 grains of calcium carbonate per cubic foot of resin. This value is generally designated as the capacity of the active material and is the average of several runs.

After the bed is exhausted it may be regenerated or reactivated by washing it with a dilute alkaline solution e. g., a 2% solution of sodium carbonate, sodium hydroxide, etc. followed by a distilled water wash to remove the retained alkaline solution, whereupon the bed is then ready for another cycle.

EXAMPLE 2

243 parts of formalin (37% formaldehyde in water)
63 parts of melamine
3 parts of triethanolamine
150 parts of water This mixture is heated at about 80° C. until the melamine has dissolved. The solution is cooled to about 30° C. and a cool solution of 73 parts of triethylene tetramine in 150 parts of water is added. The temperature rises to 50° C. and it is maintained at that point for 10 minutes. About 83 parts of hydrochloric acid (37% HCl in water) are added to the resulting mixture and the temperature raised to about 95° C. A soft transparent gel is formed in about ½ hour and after standing 2 hours it is broken up and placed in an oven at around 50° C. for about 42 hours and further heat-treated for 7 hours at 90° C. The dried material is ground, screened and further processed according to Example 1.

The resulting product has a packed density of about 11.9 pounds per cubic foot and exhibits an average capacity for anion absorption equivalent to about 10,700 grains of calcium carbonate per cubic foot of resin.

EXAMPLE 3

243 parts of formalin (37% formaldehyde in water)
63 parts of melamine
3 parts of triethanolamine
150 parts of water This mixture is heated at about 80° C. until the melamine has dissolved. The solution is cooled to about 30° C. and a cool solution of 73 parts of triethylene tetramine in 150 parts of water is added. The temperature rises to 50° C. and it is kept at that point for 10 minutes. About 83 parts of hydrochloric acid (37% HCl in water) are added to the resulting mixture and the temperature raised to about 95° C. A soft rubbery gel is formed after about ½ hour and after standing approximately 2 hours it is broken up and placed in an oven at about 50° C. and dried for about 16 hours followed by an additional 6 hours at about 100° C. The dried material is ground, screened and further processed according to Example 1. The resulting product has a packed density of about 20.5 pounds per cubic foot and it has an initial capacity equivalent to about 8100 grains of calcium carbonate per cubic foot, gradually dropping off to a capacity equivalent to about 6500 grains of calcium carbonate per cubic foot of resin after around ten runs.

EXAMPLE 4

243 parts of formalin (37% formaldehyde in water)
126 parts of melamine
3 parts of triethanolamine
300 parts of water This mixture is heated at about 80° C. until the melamine has dissolved. The solution is cooled to 35° C. and a cool solution of 146 parts of triethylene tetramine in 100 parts of water is added. The temperature is raised to 80° C. and the heating continued for 10 minutes. About 202 parts of hydrochloric acid (37% HCl in water) are added and the temperature maintained at about 80° C. for approximately 2 minutes. The syrup is removed from the steam bath and it immediately begins to gel to form a soft, stiff, yellow gel which is broken into small pieces and dried for about 16 hours at around 50° C. and further heat-treated for an additional 5 hours at 100° C. The dried material is ground, screened and further processed according to Example 1. The resulting product has a packed density of about 8.0 pounds per cubic foot and has an average capacity for anion absorption equivalent to about 4,500 grains of calcium carbonate per cubic foot of resin.

EXAMPLE 5

243 parts of formalin (37% formaldehyde in water)
63 parts of melamine
3 parts of triethanolamine
150 parts of water This mixture is heated at about 80° C. until the melamine has dissolved. The solution is cooled to about 30° C. and a cool solution of 52 parts of diethylene triamine in 150 parts of water is added. The temperature is raised to 45° C. and the heating continued for 10 minutes. About 60 parts of hydrochloric acid (37% HCl in water) are added to the solution. The temperature is raised to about 95° C. and after about 10 minutes a transparent red gel is formed which becomes opaque and harder upon heating for an additional half hour on a steam bath. After standing 2 hours the gel is broken up and placed in an oven at 50° C. for 42 hours followed by an additional heat-treatment at 90° C. for 7 hours. The dried material is ground, screened and further processed according to Example 1. The resulting product has a packed density of about 24.0 pounds per cubic foot and exhibits an average capacity for anion absorption equivalent to about 10,000 grains of calcium carbonate per cubic foot of resin.

EXAMPLE 6

243 parts of formalin (37% formaldehyde in water)
126 parts of melamine
3 parts of triethanolamine This mixture is heated at about 80° C. until the melamine has dissolved. The solution is cooled to 35° C. and a cool solution of 103 parts of diethylene triamine in 200 parts of water is added. The temperature is raised to 75° C. and maintained at this point for 10 minutes. About 178 parts of hydrochloric acid (37% HCl in water) are added to the solution. The syrup is heated for an additional 2 minutes and as soon as the heating is stopped, a hard yellow gel forms immediately. This gel is broken up and dried for about 64 hours at around 50° C. and heated at 100° C. for an additional 5 hours. The dried material is ground, screened and further processed according to Example 1. The resulting product has a packed density of about 14.9 pounds per cubic foot and it has an average capacity for anion absorption equivalent to about 5700 grains of calcium carbonate per cubic foot of resin.

EXAMPLE 7

405 parts of formalin (37% formaldehyde in water)
126 parts of melamine
5 parts of triethanolamine
200 parts of water This mixture is heated at about 80° C. until the melamine dissolves to form a syrup which is then cooled to about 40° C. To this syrup about 86 parts of an aqueous solution of ethylene diamine (70.0% ethylene diamine) are added. During the addition of the diamine to the syrup the temperature rises to about 60° C. at which point it is maintained for about 10 minutes and during which time the syrup is agitated. About 90 parts of hydrochloric acid (37% HCl in water) are added and the temperature is raised to 95° C. After about 5 minutes a soft, rubbery, red gel is formed which becomes harder upon standing. After about ½ hour it is broken up into small pieces and air dried for about 3 hours and then placed in an oven and dried for about 16 hours at around 60° C. followed by an additional heat-treatment at 100° C. for about 7 hours. The dried material is ground, screened and further processed according to Example 1. The resulting product has a packed density of about 27.1 pounds per cubic foot and it has an average capacity for the absorption of anions equivalent to about 7,600 grains of calcium carbonate per cubic foot.

EXAMPLE 8

243 parts of formalin (37% formaldehyde in water)
126 parts of melamine
3 parts of triethanolamine
200 parts of water This mixture is heated at about 80° C. until the melamine has dissolved. The syrup thus produced is cooled to about 40° C. and 86 parts of an aqueous solution containing 70.1% of ethylene diamine are added. The resulting mixture is heated to 80° C. and maintained at that point for about 20 minutes. 133 parts of hydrochloric acid (37% HCl in water) are added. A soft transparent gel forms in about 5 minutes and within a short time it becomes opaque and hard. The gel is broken in small pieces and dried for about 16 hours at around 50° C. and further heat-treated for an additional 5 hours at 100° C. The resulting product has a packed density of about 21.9 pounds per cubic foot and exhibits an average capacity for the absorption of anions equivalent to about 7500 grains of calcium carbonate per cubic foot of resin.

Preparation of benzoyl diethylene triamine 103 parts of diethylene triamine
122 parts of benzoic acid The benzoic acid is added to the diethylene triamine in a suitable reaction vessel provided with an agitator and a heating means such as an oil bath. The reaction vessel is also provided with a condenser and a trap for collecting condensed vapors. Upon mixing the benzoic acid and diethylene triamine the temperature rises to about 100° C. The mixture is heated to about 220°–230° C. and maintained at that point for about 2 hours. The vapor temperature rises to about 180° C. during the first 40 minutes of heating. The condensate which is collected amounts to about 27 parts and contains about 6 parts of unreacted diethylene triamine. The residue in the reaction vessel is a very viscous yellow syrup having a musty odor.

25 grams of this product were dissolved in 250 cc. of a hot aqueous solution containing 20% alcohol and decolorizing charcoal was added. The solution was filtered and cooled rapidly with stirring in an ice bath. A fine, soft, solid material is precipitated, filtered off and washed with 100 cc. of an aqueous solution containing 20% alcohol and dried. The melting point of this purified product was 109° C. and an analysis indicated that it was essentially composed of the dibenzoyl derivative of diethylene triamine together with a small amount of the monobenzoyl derivative.

EXAMPLE 9

182 parts of formalin (37% formaldehyde in water)
62 parts of melamine
3 parts of triethanolamine
100 parts of water The melamine is dissolved in the formalin to which the triethanolamine and water have been added by heating it up to about 80° C. The melamine-formaldehyde syrup thus produced is cooled to about 30° C. and it is added to the syrupy reaction product of benzoic acid and diethylene triamine made according to the procedure set forth above. The temperature of the mixture rises to about 40° C. and a clear, red-orange solution results. This mixture is heated for about 10 minutes at 75° C. and about 36 parts of hydrochloric acid (37% HCl in water) are added. In about 10 minutes a soft gel forms which upon standing becomes opaque and harder. The gel is broken up into small pieces and optionally air dried, during which time the gel becomes very hard. The gel is dried for about 64 hours at 50° C. followed by a further heat-treatment at 100° C. for about 6 hours. The product is a hard, dark brownish-black colored, glossy material. The dried material is ground, screened and further processed according to Example 1. The resulting product has a packed density of about 27.7 pounds per cubic foot and it exhibits an average capacity for anion absorption equivalent to about 4,500 grains of calcium carbonate per cubic foot of resin.

Preparation of benzoyl triethylene tetramine 240 parts of benzoic acid
292 parts of triethylene tetramine These substances are mixed in a reaction vessel such as described for the production of benzoyl diethylene triamine. The temperature of the mixture rises to about 100° C. and it is then heated to 230°–235° C. and maintained at that temperature for about 2½ hours. During most of the reaction the vapor temperature is around 145° C. rising to about 170° C. when the reaction is almost complete. The condensate collected during the reaction amounts to about 48 parts of which about 17 parts is unreacted triethylene tetramine. The product remaining as a residue in the reaction vessel is a viscous yellow syrup.

25 grams of the syrup thus produced are dissolved in 200 cc. of a hot aqueous solution containing 20% alcohol, decolorizing charcoal is added and the solution filtered. On cooling, soft, fine, white, needle-like crystals are precipitated and they are filtered off and dried. These crystals are again recrystallized from an aqueous solution containing 20% alcohol and the purified product softens at approximately 80° C. and melts at 88° C. Analysis indicates that the purified product is essentially the dibenzoyl derivative of triethylene tetramine.

EXAMPLE 10

304 parts of formalin (37% formaldehyde in water)
95 parts of melamine
4 parts of triethanolamine
150 parts of water A melamine-formaldehyde syrup is prepared as previously described and added to about 188 parts of the benzoyl triethylene tetramine syrup prepared according to the process set forth above. The temperature rises to about 55° C. and the mixture is heated for about 15 minutes at 75° C. The syrup which is slightly opaque at this point is acidified by adding about 79 parts of hydrochloric acid (37% HCl in water), thereby producing a clear, red solution. A soft red transparent gel is formed in about ½ hour. This product is broken up and after standing for a short time to air dry, it is placed in an oven and dried for about 24 hours at 50° C. followed by a six-hour heat treatment at about 100° C. The product is then very hard and black. The dried material is ground, screened and further processed according to Example 1. The resulting product has a packed density of about 23.2 pounds per cubic foot and it has a average capacity for anion absorption equivalent to about 8,240 grains of calcium carbonate per cubic foot of resin for the first several runs and gradually drops on subsequent runs to about 6000–7000 grains of calcium carbonate per cubic foot.

*Preparation of benzoyl tetraethylene pentamine*

378 parts of tetraethylene pentamine
244 parts of benzoic acid

These materials are reacted in the same manner as in the preparation of the benzoyl derivatives of other polyamines as described above. During the reaction the vapor temperature rises to about 170° C. and about 37 parts of the condensate are collected. The syrup which remains as a residue in the reaction vessel is not quite as viscous but has a reddish yellow color as compared to the benzoyl triethylene tetramine.

A small quantity of the syrup is stirred into water giving a colorless solid material. A small proportion of an aqueous solution of sodium hydroxide is added to remove any trace of benzoic acid and the mixture is filtered. The solid material is filtered off and recrystallized twice from an aqueous solution containing 20% alcohol. The soft white solid product thus obtained is again treated with an aqueous solution of sodium hydroxide, filtered, washed with water and crystallized from 5% hydrochloric acid and then from 2% hydrochloric acid. Microscopic needle-like crystals are obtained and they melt at about 250° C. and an analysis of the product indicates that it is the trihydrochloride of the dibenzoyl derivative of tetraethylene pentamine.

EXAMPLE 11

344 parts of formalin (37% formaldehyde in water)
126 parts of melamine
4 parts of triethanolamine
200 parts of water These substances are heated at about 80° C. to produce a melamine-formaldehyde syrup which is cooled to 30° C. and mixed with about 147 parts of the benzoyl tetraethylene pentamine according to the procedure outlined above. The temperature of the mixture rises to 50° C. and it is heated at 75° C. for about 15 minutes and then acidified by the addition of about 95 parts of hydrochloric acid (37% HCl in water). A clear red liquid is obtained which forms a transparent gel in about 5 minutes. This gel becomes slightly opaque upon standing for a short time. It is broken up into small pieces, air-dried for a short time, dried at about 50° C. for 24 hours followed by a six-hour heat-treatment at about 100° C., thereby producing a black, very hard, lustrous material. The dried material is ground, screened and further processed according to Example 1. The resulting product has a packed density of about 27.0 pounds per cubic foot and exhibits an initial capacity for the absorption of anions equivalent to about 10,000 grains of calcium carbonate per cubic foot of resin. This value gradually drops to about 7000–6000 grains of calcium carbonate per cubic foot after several subsequent runs.

EXAMPLE 12

223 parts of formalin (37% formaldehyde in water)
63 parts of melamine
3 parts of triethanolamine
100 parts of water These substances are heated at about 80° C. to produce a melamine-formaldehyde syrup and then cooled to about 30° C. and mixed with about 147 parts of benzoyl tetraethylene pentamine prepared according to the process described above. The temperature rises to about 60° C. and the mixture is heated at 75° C. for about 15 minutes and acidified with 95 parts of hydrochloric acid (37% HCl in water), thereby producing a clear, red liquid. A transparent, red gel forms in about 5 minutes and it is broken up, air-dried for a short time, dried in an oven at 50° C. for about 24 hours and further heat-treated for 6 hours at 100° C. An extremely black material is obtained. The dried material is ground, screened and further processed according to Example 1. The resulting product has a packed density of about 22.0 pounds per cubic foot and it has an average capacity for anion absorption equivalent to about 10,500 grains of calcium carbonate per cubic foot of resin.

EXAMPLE 13

460 parts of formalin (37% formaldehyde in water)
126 parts of melamine
4 parts of triethanolamine
100 parts of water This mixture is heated at about 80° C. until the melamine has dissolved. The resulting syrup is cooled to 30° C. and a cool solution of 118 parts of mixed polyamines in 100 parts of water is added, the temperature rising to about 60° C. The solution is heated to about 75° C. and maintained at that point for about 10 minutes at which time the material sets to a firm, white, opaque gel. This gel is air dried for a short period of time and becomes very hard and slightly cream-colored (nearly white). It is dried for about 24 hours at around 50° C. and further heat-treated for an additional 6 hours at 100° C., thereby producing an extremely hard, white material. The dried material is ground, screened and further processed according to Example 1. The resulting product has a packed density of about 13.7 pounds per cubic foot and it has an initial capacity for anion absorption equivalent to about 10,520 grains of calcium carbonate per cubic foot of resin.

EXAMPLE 14

460 parts of formalin (37% formaldehyde in water)
126 parts of melamine
4 parts of triethanolamine
100 parts of water.

This mixture is heated at about 80° C. until the melamine has dissolved. The resulting syrup is cooled to 30° C. and a cool solution of 118 parts of mixed polyamines in 100 parts of water is added. The temperature rises to 60° C. and 149 parts of hydrochloric acid (37% HCl in water) are added. The temperature rises to 80° C. and the color changes from yellow to red. After heating with agitation for about 8 minutes, the syrup becomes very thick and a soft gel forms which becomes harder quite rapidly. This gel is at first red and transparent but gradually becomes slightly opaque on standing. It is broken into small pieces, air-dried for a short time, placed in an oven and dried at around 50° C. for 24 hours followed by a further heat treatment at 100° C. for 6 hours. A very hard, black, lustrous resin is produced. The dried material is ground, screened and further processed according to Example 1. The resulting product has a packed density of about 24.1 pounds per cubic foot and it exhibits an initial capacity for anion absorption equivalent to about 14,465 grains of calcium carbonate per cubic foot of resin. This value drops gradually after several runs to about 11,000 grains of calcium carbonate per cubic foot.

*Preparation of benzoyl polyethylene mixture*

366 parts of benzoic acid
366 parts of benzoic acid polyamine mixture

These substances are mixed and heated in an oil bath maintained at 215°–230° C. for about 2½ hours. During the reaction the temperature of the reactants rises from about 185° C. up to about 216° C. and about 101 parts of condensate are collected. The product which remains as a residue is a viscous, yellow syrup.

EXAMPLE 15

230 parts of formalin (37% formaldehyde in water)
63 parts of melamine
3 parts of triethanolamine
100 parts of water A melamine-formaldehyde syrup is prepared by heating this mixture at about 80° C. until the melamine has dissolved. It is cooled to 30° C. and added to the benzoyl polyamine syrup according to the procedure outlined above. The temperature rises to about 45° C. and the mixture is heated to about 75° C. for 15 minutes. About 48 parts of hydrochloric acid (37% HCl in water) are added to the syrup thus produced and upon standing about 15 minutes a soft transparent-orange-red gel is formed. This gel becomes somewhat harder and more opaque upon standing. The gel is broken up into small pieces, air-dried for a short time, then dried at 50° C. for about 16 hours and further heat-treated at about 100° C. for 6 hours. The product is a black lustrous material. The dried material is ground, screened and further processed according to Example 1. The resulting product has a packed density of about 25.5 pounds per cubic foot and it has an average capacity for anion absorption equivalent to about 6,400 grains of calcium carbonate per cubic foot of resin.

EXAMPLE 16

352 parts of formalin (37% formaldehyde in water)
126 parts of melamine
3 parts of triethanolamine
200 parts of water A melamine-formaldehyde syrup is prepared from these substances as in the preceding examples and added to about 111 parts of the benzoyl polyamine prepared above. The reaction is carried out as in Example 15 and an opaque cream-colored gel is formed about 10 minutes after acidification. This gel is air-dried for a short time, dried at about 50° C. for 16 hours followed by a further heat treatment for 6 hours at 100° C. The dried material is ground, screened and further processed according to Example 1. The resulting product has a packed density of about 18.3 pounds per cubic foot and it has an average capacity for anion absorption equivalent to about 8000 grains of calcium carbonate per cubic foot of resin.

The mixed polyamines used in Examples 13 and 14 include diethylene triamine (about 75%), triethylene tetramine (about 15%) and tetra-ethylene pentamine (about 10%) and may be obtained by reacting ammonia and ethylene chloride or the like. The mixed polyamines have an average molecular weight of about 118.

While melamine-formaldehyde resins are generally preferred as the insolubilizing agent, other aminotriazine resins may be used, such as, for example, the condensation products of aminotriazines which may include melamine itself and its derivatives such as 2,4,6-triethyl and triphenyl triamino-1,3,5-triazines, 2,4,6-trihydrazino-1,3,5-triazine, as well as triazines containing 1 or 2 amino groups such as the guanamines, e. g., formoguanamine, lauroguanamine, etc., 2-amino-1,3,5-triazine and their substitution products, etc., in other words, an aminotriazine having 2 to 6 hydrogen atoms bound to aminonitrogen attached to the triazine ring, with an aldehyde e. g., formaldehyde, acetaldehyde, propionaldehyde, butyraldehyde, benzaldehyde, cinnamyl aldehyde, furfural, etc. Polymers of formaldehyde or substances which yield formaldehyde may be used in place of formaldehyde itself. Furthermore, various mixtures of aldehydes may be employed. Obviously commercial mixtures of the various aminotriazines or mixtures thereof with other formaldehyde-reactive materials and the like may also be used. One example of such commercial mixtures is the product obtained by heating dicyandiamide sufficiently to obtain a significant amount of melamine, together with other reactive aminotriazine bodies.

In some instances, other insolubilizing materials may be used in conjunction with the melamine-formaldehyde condensation products, e. g., phenol- and cresol-formaldehyde condensation products, dicyandiamide-formaldehyde reaction products, etc. It may be desirable to react other substances with formaldehyde in conjunction with the polyamine and the melamine, e. g., phenol, aniline, phenylene diamine, guanidine and its salts, dicyandiamide, alkyl and aryl guanidines, etc. Other materials which show good anion activity when condensed with formaldehyde may also be included in the compositions, e. g., biguanide, guanyl urea, guanidine, etc.

Polyamines suitable for use according to this invention include: ethylene diamine, trimethylene diamine, tetramethylene diamine, pentamethylene diamine, hexamethylene diamine and the polyethylene polyamines, e. g., diethylene triamine, triethylene tetramine, tetraethylene pentamine, etc. Partially acylated and partially alkylated polyamines may also be used, e. g., the mono-and dibenzoyl derivatives, the mono- and disulfanilic acid derivatives, the mono- and diacetyl derivatives, the mono-and dibutyryl derivatives, etc. of the foregoing amines. Triacylated, trialkylated or higher substitution products of the polyamines may be employed in some instances where there are a sufficient number of free reactive amino groups to form resinous condensation products with formaldehyde. Various mixtures of the polyamines and especially mixtures of the polyethylene polyamines may be utilized.

The polyamines are preferably condensed with formaldehyde but if desired any aldehyde may be utilized, for example, those mentioned in connection with the aminotriazines above. It is also possible to use different aldehydes for the condensation of the polyamine and the aminotriazine. In this case, however, the initial condensation of the aminotriazine and polyamine should be carried out separately.

The polyamines used herein are only those polyamines wherein the amino groups are connected to the other amino groups by means of aliphatic linkages. In the claims the term "polyamine" is intended to cover such amines and including N-alkyl and N-aryl substituted polyamines.

My condensation products may be produced by any suitable method or with any desired combining ratio of aldehyde to the mixture of reactive materials including polyamine and aminotriazine. I have found in general that the optimum ratio of formaldehyde to the reactive materials may be approximated on the basis of 1 mol of formaldehyde for each 2 mols of active hydrogen attached to nitrogen in the reactive materials. Thus, for example, melamine has six active hydrogens and diethylene triamine has five active hydrogens and accordingly 3 mols of formaldehyde are used for each mol of melamine and in addition 2½ mols of formaldehyde are used for each mol of diethylene triamine. Similar proportions are used with other polyamines in accordance with the number of active hydrogens which they possess. Generally it has been found that the molal ratio of formaldehyde to the reactive materials should preferably not be too high as otherwise good gels are not easily obtainable.

The initial condensation of the polyamine with formaldehyde is carried out at a pH between about 6–11 although more preferably at a pH between about 7–10. The melamine or other aminotriazine may be condensed with the formaldehyde simultaneously or it may be condensed separately by reacting the melamine with a formaldehyde solution conveniently at a pH of about 7–9. If the melamine and polyamine be reacted with the formaldehyde separately with the solutions of each of the condensation products are combined to form a homogeneous solution of the mixed condensation products. The initial condensation is preferably carried out at temperatures in the neighborhood of 65°–90° C. although in some instances it may be desirable to use temperatures as low as room temperature or as high as the reflux temperature.

The initial condensation product prepared in accordance with the preceding paragraph is gelled by adding sufficient acid to lower the pH below 4 and preferably to around 2–3. It is desirable that a strong acid be used for this purpose although virtually any acid which will lower the pH to the desired point may be employed. Hydrochloric acid is especially suitable for the acid gellation while other examples of suitable acids include sulfuric acid, phosphoric acid, formic acid, acetic acid, etc. The gellation of the condensation product usually occurs at temperatures ranging from room temperature up to around 90° C. in from a few minutes to a few hours. When the gel first forms it is usually relatively soft, but after aging the gel gradually becomes harder. Accordingly the gel may be permitted to age for a day or two if a harder gel than that originally obtained be desired.

The gel is generally ground or broken into small pieces, spread on trays, dried and cured. The drying and curing may be carried out more or less simultaneously, preferably at gradually increasing temperatures. Thus the gel may be air-dried for a few hours at room temperature (although this is optional), dried at about 50° C. for from 2 hours to about 1 day and finally at about 100° C. for from about 1 hour to 1 day. During the drying the resin gel cures at temperatures ranging from about 50° C. to about 160° C. To obtain a satisfactory cure the temperature should be maintained within that range for at least ½ hour. If relatively low curing temperatures be used the time will be necessarily be longer than the time required at the higher temperatures to obtain the same degree of cure.

The condensation reaction may be carried out by simultaneously reacting the polyamine, the aminotriazine and aldehyde or the polyamine and aminotriazine may be reacted with the aldehyde separately, or one of these substances may be added to a reaction mixture of the other substance with the aldehyde at any stage of the process.

Sufficient ion active material should be included to provide a material having a susbtantial anion active capacity. For this purpose the amount required varies widely with the solubility of the particular anion active material used, the activity of the concentration of the anionic materials in the fluids to be treated, etc. In general, a molal ratio of the polyamine to the other aldehyde-reactive component including melamine should preferably be between about 1:1 and 1:4. My resins are essentially aldehyde condensation products of a polyamine and an aminotriazine, that is to say, the molal ratio of polyamine to any other active component is at least 1:1 and the molal ratio of aminotriazine to any other insolubilizing aldeyhde-reactive component is greater than 1:1.

My anion active resins have the capacity for the extraction of anions from fluid media equivalent to about 5,000–17,000 grains of calcium carbonate per cubic foot of resin.

My anion active materials are suitable for the extraction of all kinds of acids and anions in general. Thus they may be utilized to extract the strong mineral acids (preferably in relatively low concentrations), organic acids such as acetic acid, oxalic acid, etc. The anions of salts such as the chloride ion from ammonium chloride may also be removed by means of my resinous materials.

My products are useful for many purposes, examples of which are: water softening, acid removal from water, acid removal from alcohol solutions, etc., purification of sugar juices, etc. My resins are especially suitable for the removal of acids, both organic and inorganic, from aqueous media. Apparently any acid, soluble in water, may be separated by means of my resins in the manner described above. Furthermore, my resins may be used to extract acids from fluid media other than water and may even be used for the extraction of acids from vapors. My resins may also be used to absorb or adsorb gases.

To be sufficiently insoluble for pratical use in this art a resin should have a sufficiently low solubility that it will not be dissolved away rapidly by the solution to be treated. Thus a solution having a concentration of 0.003 N acid (½ HCl and ½ $H_2SO_4$) should not dissolve more than 1 part of resin in 1000 parts of solution when passed through a bed of the resin (after the first cycle comprising an activation, exhaustion and reactivation of the resin). The terms "insoluble" and "insolubilized" as used herein are to be interpreted in the foregoing manner.

This application is a continuation-in-part of my copending applications Serial No. 407,097, filed August 15, 1941, and Serial No. 442,282, filed May 8, 1942, both of which are now abandoned.

Obviously many modifications and variations in the processes and compositions described above may be made without departing from the spirit and scope of the invention.

I claim:
1. A fluid purification material which is a substantially water and dilute acid insoluble, granular, cured resin and which consists of an alkylene polyamine-formaldehyde condensation product wherein the amino groups of the polyamine are connected by aliphatic linkages, the amino groups of said polyamine having at least one hydrogen attached to each amino group prior to condensation with formaldehyde, said condensation product normally having substantial water and dilute acid solubility but being insolubilized by interpolymerization with a formaldehyde condensation product of an aminotriazine having 2 to 6 hydrogen atoms bound to amino nitrogen attached to the triazine ring, said insoluble resin being essentially a formaldehyde condensation product of alkylene polyamine and aminotriazine in which the molar ratio of alkylene polyamine to aminotriazine is from about 1:1 to 1:4 and which contains 0.5 mol of formaldehyde for each mol of hydrogen attached to amino nitrogen in said alkylene polyamine and in said aminotriazine.

2. A fluid purification material which is a substantially water and dilute acid insoluble, granular, cured resin and which consists of a polyethylene polyamine-formaldehyde condensation product wherein each of the amino groups of the said polyamine has at least one hydrogen attached to the nitrogen atom thereof before condensation with formaldehyde, said condensation product normally having substantial water and dilute acid solubility but being insolubilized by interpolymerization with a formaldehyde condensation product of an amino-triazine having 2-6 hydrogen atoms bound to amino nitrogen attached to the triazine ring, said insoluble resin being essentially a formaldehyde condensation product of polyethylene polyamine and aminotriazine in which the molar ratio of polyethylene polyamine to aminotriazine is from about 1:1 to 1:4 and which contains 0.5 mol of formaldehyde for each mol of hydrogen attached to amino nitrogen in said alkylene polyamine and in said aminotriazine.

3. A fluid purification material which is a substantially water and dilute acid insoluble, granular, cured resin and which consists of a polyethylene polyamine-formaldehyde condensation product wherein each of the amino groups of the said polyamine has at least one hydrogen attached to the nitrogen atom thereof before condensation with formaldehyde, said condensation product normally having substantial water and dilute acid solubility but being insolubilized by interpolymerization with a formaldehyde condensation product of melamine, said insoluble resin being essentially a formaldehyde condensation product of polyethylene polyamine and melamine in which the molar ratio of polyethylene polyamine to melamine is from about 1:1 to 1:2 and which contains 0.5 mol of formaldehyde for each mol of hydrogen attached to amino nitrogen in said polyethylene polyamine and in said melamine.

4. A process for removing anions from fluid media which comprises contacting an anion active material including a substantial proportion of an anion active alkylene polyamine-formaldehyde condensation product which normally has substantial solubility in water and dilute acid but which is rendered insoluble therein by interpolymerization with a formaldehyde condensation product of an aminotriazine having from 2-6 hydrogen atoms bound to amino nitrogen attached to the triazine ring, with a fluid medium containing anions and thereafter separating the fluid medium from said anion active material, said anion active material being essentially a formaldehyde condensation product of alkylene polyamine and aminotriazine in which the molar ratio of alkylene polyamine to aminotriazine is from about 1:1 to 1:4 and which contains 0.5 mol of formaldehyde for each mol of hydrogen attached to amino nitrogen in said alkylene polyamine and in said amino-triazine.

5. A process for removing anions from fluid media which comprises contacting an anion active material including a substantial proportion of an anion active alkylene polyamine-formaldehyde condensation product which normally has substantial solubility in water and dilute acid but which is rendered insoluble therein by interpolymerization with a melamine-formaldehyde condensation product, with a fluid medium containing anions and thereafter separating the fluid medium from said anion active material, said anion active material being essentially a formaldehyde condensation product of alkylene polyamine and melamine in which the molar ratio of alkylene polyamine to melamine is from about 1:1 to 1:4 and which contains 0.5 mol of formaldehyde for each mol of hydrogen attached to amino nitrogen in said alkylene polyamine and in said melamine.

6. A process for removing anions from fluid media which comprises contacting an anion active material including a substantial proportion of an anion active polyethylene polyamine-formaldehyde condensation product which normally has substantial solubility in water and dilute acid but which is rendered insoluble therein by interpolymerization with a melamine-formaldehyde condensation product with a fluid medium containing anions and thereafter separating the fluid medium from said anion active material, said anion active material being essentially a formaldehyde condensation product of polyethylene polyamine and melamine in which the molar ratio of polyethylene polyamine to melamine is about 1:1 to 1:2 and which contains 0.5 mol of formaldehyde for each mol of hydrogen attached to amino nitrogen in said polyethylene polyamine and in said melamine.

7. A process for removing anions from aqueous media which comprises contacting an anion active material including a substantial proportion of an anion active polyethylene polyamine-formaldehyde condensation product which normally has substantial solubility in water and dilute acid but which is rendered insoluble therein by interpolymerization with a melamine-formaldehyde condensation product with an aqueous medium containing anions and thereafter separating the fluid medium from said anion active material, said anion active material being essentially a formaldehyde condensation product of polyethylene polyamine and melamine in which the molar ratio of polyethylene polyamine to melamine is from about 1:1 to 1:2 and which contains 0.5 mol of formaldehyde for each mol of hydrogen attached to amino nitrogen in said polyethylene polyamine and in said melamine.

8. A process for removing anions from aqueous media which comprises contacting an anion active material including a substantial proportion of an anion active formaldehyde product of a mixture of alkylene polyamines which normally has substantial solubility in water and in dilute acid but which is rendered insoluble therein by interpolymerization with a melamine-formaldehyde condensation product with an aqueous medium containing anions and thereafter separating the fluid medium from said anion active material, said anion active material being essentially a formaldehyde condensation product of said mixture of alkylene polyamines and melamine in which the molar ratio of alkylene polyamines to melamine is from about 1:1 to 1:4 and which contains 0.5 mol of formaldehyde for each mol of hydrogen attached to amino nitrogen in said alkylene polyamines and in said melamine.

9. A process for removing acids from aqueous media which comprises contacting an anion active material including a substantial proportion of an anion active polyethylene polyamine-formaldehyde condensation product which normally has substantial solubility in water and in dilute acid but which is rendered insoluble therein by interpolymerization with a melamine-formaldehyde condensation product with an aqueous medium containing an acid and thereafter separating the fluid medium from said anion active material, said anion active material being essentially a formaldehyde condensation product of polyethylene polyamine and melamine in which the molar ratio of polyethylene polyamine to melamine is from about 1:1 to 1:4 and which contains 0.5 mol of formaldehyde for each mol of hydrogen attached to amino nitrogen in said polyethylene polyamine and in said melamine.

10. A fluid purification material which is a substantially water and dilute acid insoluble, granular, cured resin and which consists of an alkylene polyamine-formaldehyde condensation product wherein the alkylene polyamine is selected from the group consisting of ethylene diamine, diethylene triamine, triethylene tetramine, tetraethylene pentamine, and mixtures thereof, said condensation product normally having substantial water and dilute acid solubility but being insolubilized by interpolymerization with a formaldehyde condensation product of an aminotriazine having 2 to 6 hydrogen atoms bound to amino nitrogen attached to the triazine ring, said insoluble resin being essentially a formaldehyde condensation product of alkylene polyamine and aminotriazine in which the molar ratio of alkylene polyamine to aminotriazine is from about 1:1 to 1:4 and which contains 0.5 mol of formaldehyde for each mol of hydrogen attached to amino nitrogen in said alkylene polyamine and in said aminotriazine.

JAMES R. DUDLEY.

REFERENCES CITED

The following references are of record in the file of this patent:

UNITED STATES PATENTS

| Number | Name | Date |
|---|---|---|
| 2,151,883 | Adams et al. | Mar. 28, 1939 |
| 2,223,930 | Griessbach | Dec. 3, 1940 |
| 2,251,234 | Swain | July 29, 1941 |
| 2,259,169 | Little | Oct. 14, 1941 |
| 2,285,750 | Swain | June 9, 1942 |
| 2,325,375 | D'Alelio | July 27, 1943 |
| 2,334,545 | D'Alelio | Nov. 16, 1943 |
| 2,388,235 | Bowman | Nov. 6, 1945 |

FOREIGN PATENTS

| Number | Country | Date |
|---|---|---|
| 106,727 | Australia | Mar. 9, 1939 |
| 848,653 | France | July 31, 1939 |